US009869390B2

(12) United States Patent
Kennedy et al.

(10) Patent No.: US 9,869,390 B2
(45) Date of Patent: Jan. 16, 2018

(54) WEAR-PROTECTION LAYER FOR PISTON RINGS

(71) Applicant: FEDERAL-MOGUL BURSCHEID GMBH, Burscheid (DE)

(72) Inventors: Marcus Kennedy, Dusseldorf (DE); Michael Zinnabold, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 395 days.

(21) Appl. No.: 14/428,140

(22) PCT Filed: Sep. 9, 2013

(86) PCT No.: PCT/EP2013/068568
§ 371 (c)(1),
(2) Date: Mar. 13, 2015

(87) PCT Pub. No.: WO2014/040940
PCT Pub. Date: Mar. 20, 2014

(65) Prior Publication Data
US 2015/0252901 A1 Sep. 10, 2015

(30) Foreign Application Priority Data

Sep. 14, 2012 (DE) .................. 10 2012 018 276

(51) Int. Cl.
| | | |
|---|---|---|
| B22F 7/04 | (2006.01) | |
| F16J 9/26 | (2006.01) | |
| C23C 4/06 | (2016.01) | |
| C22C 27/06 | (2006.01) | |
| C22C 30/00 | (2006.01) | |
| F16J 9/28 | (2006.01) | |
| C23C 4/067 | (2016.01) | |
| C23C 4/129 | (2016.01) | |

(52) U.S. Cl.
CPC ............... *F16J 9/26* (2013.01); *C22C 27/06* (2013.01); *C22C 30/00* (2013.01); *C23C 4/06* (2013.01); *C23C 4/067* (2016.01); *C23C 4/129* (2016.01); *F16J 9/28* (2013.01)

(58) Field of Classification Search
None
See application file for complete search history.

(56) References Cited

U.S. PATENT DOCUMENTS

2003/0180565 A1* 9/2003 Herbst-Dederichs . C22C 1/1084
428/553
2012/0306158 A1* 12/2012 Kennedy .................. C23C 4/06
277/442

FOREIGN PATENT DOCUMENTS

| DE | 10163933 A1 | | 7/2003 | |
|---|---|---|---|---|
| DE | 102008032042 B3 | | 4/2010 | |
| DE | 102009031375 A1 | | 4/2010 | |
| DE | 102009016650 B3 | | 7/2010 | |
| DE | 102009031375 | * | 11/2010 | ............... C23C 4/06 |
| DE | 102010038289 A1 | | 1/2012 | |
| WO | WO2010115448 | * | 10/2010 | ............... C23C 4/06 |

* cited by examiner

*Primary Examiner* — Seth Dumbris
(74) *Attorney, Agent, or Firm* — Robert L. Stearns; Dickinson Wright, PLLC

(57) ABSTRACT

The invention relates to a novel wear-protection layer for piston rings of internal combustion engines and a method for applying a wear-protection layer of this type during production of a piston ring. The protective layer is characterized inter alia by reduced wear and high resistance to scuffing.

11 Claims, 3 Drawing Sheets

Microstructure of the TS-V2 Variant using SEM

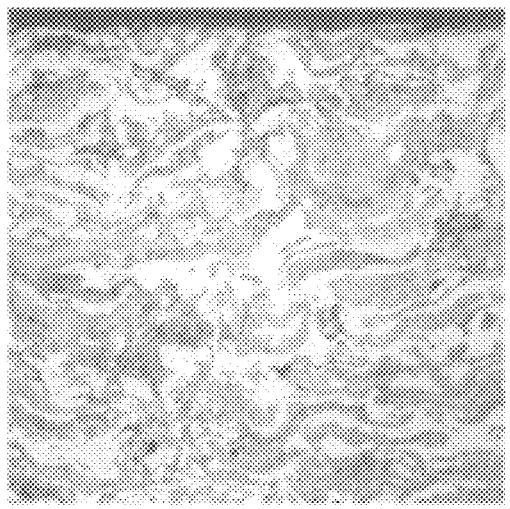
Fig. 1: Microstructure of the TS-V1 Variant using SEM
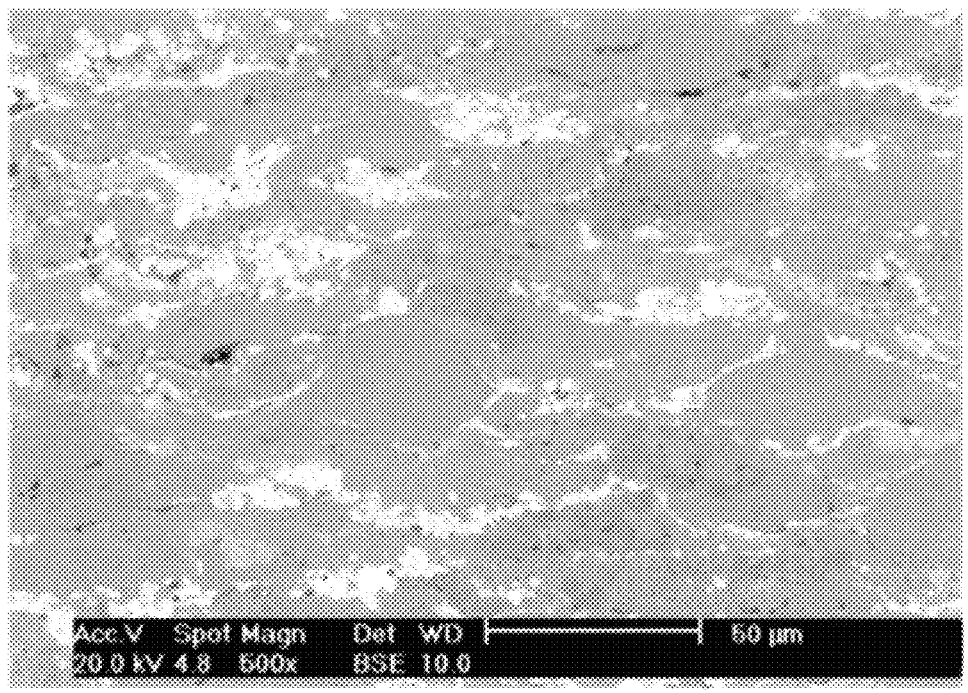
Fig. 2: Microstructure of the TS-V2 Variant using SEM

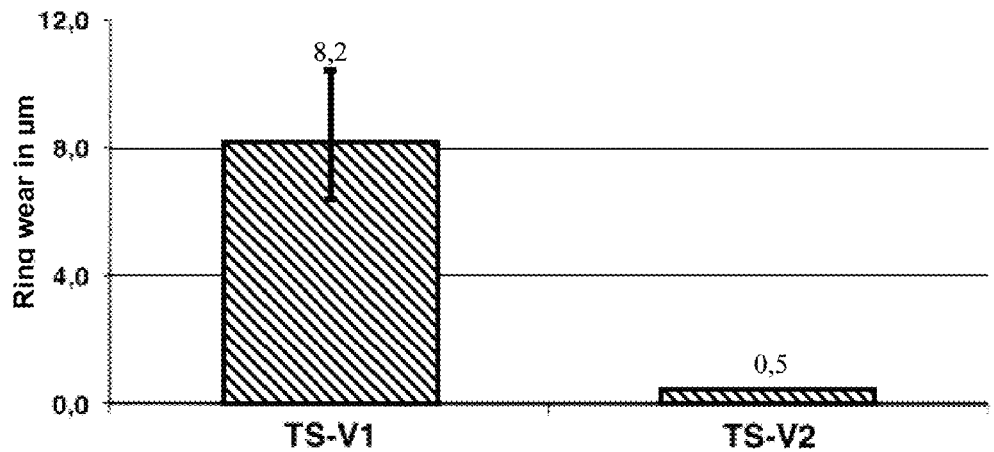
Fig. 4: Ring and cylinder lining wear after out-of-engine testing in the ring / cylinder lubricated system
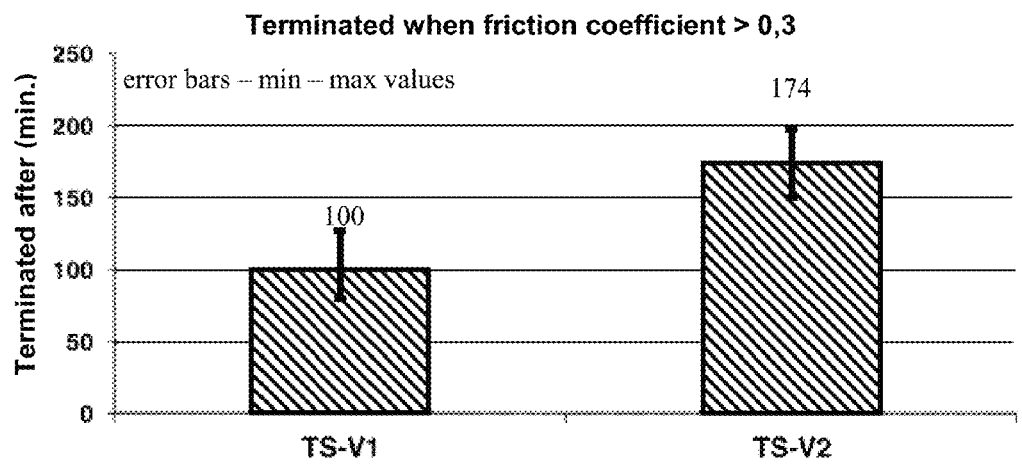
Fig. 5: Scuffing resistance of variants TS-V1 and TS-V2

WEAR-PROTECTION LAYER FOR PISTON RINGS

BACKGROUND OF THE INVENTION

1. Technical Field

The present invention relates to an improved wear-resistant coating for piston rings of internal combustion engines and a method for applying such a wear-resistant coating during the production of piston rings.

2. Related Art

Piston rings are sealing elements on the piston, for example in an internal combustion engine or a reciprocating compressor. In an internal combustion engine, piston rings close the gap between the piston head and the cylinder wall, sealing the combustion chamber. In modern combustion engines, three piston rings are generally used per cylinder, and their design varies depending on the installation location. The main task of the piston ring closest to the combustion chamber, also called the compression ring, is to create a seal and dissipate heat. The lowest ring, called the scraper ring, scrapes lubricating oil off of the cylinder wall and regulates the oil film on which the upper piston rings slide during the stroke. The middle ring helps to control the oil balance, and provides additional insulation from combustion gases.

As the piston moves up and down, the outer peripheral surface of the piston ring slides in a constant resilient abutment against the cylinder wall, and at the same time the piston ring also oscillates in its ring groove due to the rocking movements of the piston, in which its edges come to bear alternately on the top and bottom flank of the piston ring groove. As the gliding partners slide continuously over the respective other surface, the degree of wear depend on the material, and in the case of dry running can lead to seizing, scoring, and finally destruction of the engine.

In the manufacture of highly stressed parts of internal combustion engines, such as the piston rings described in the preceding, the materials most frequently used are cast iron or cast iron alloys. In highly stressed combustion engines, such as 4-stroke and 2-stroke engines, piston rings, particularly compression rings, are exposed to ever increasing loads. These include, for example, high compression peak pressure, high combustion temperature and reduced lubricating film, all of which act on the piston ring and have a decisive effect on the functional properties such as wear, scuff resistance, microwelding and corrosion resistance.

Higher peak firing pressures, lower emissions, and direct fuel injection represent further increasing loads on the piston rings. The consequences may be damage and plating of piston material, particularly on the lower piston ring flank.

As the mechanical and dynamic stresses on piston rings increase, more and more engine manufacturers are demanding piston rings demand of high grade steel (hardened and tempered alloy steel, such as material 1.4112). Steel materials have advantages better strength and toughness characteristics than cast iron, since there is no interference by free graphite in the microstructure. The materials used most frequently to manufacture steel piston rings are highly chromium-alloyed martensitic steels.

In order to further improve the behaviour of piston rings during operation, they undergo a surface treatment such as application of tin and copper layers to improve sliding properties, a coating of zinc or manganese phosphate layers for accelerated running-in behaviour, and burnishing to reduce the corrosion.

On the other hand, the sliding surfaces are also treated specifically to increase the inherent wear resistance thereof and reduce abrasion and adhesion wear, for example by chromizing, deposition of metal-ceramic composite layers or molybdenum layers, or by nitriding or nitro-carburizing A commercially available piston ring coating is known by the brand name MKP200 and contains a composite of molybdenum and $Cr_2C_3$—NiCr.

However, even with such coatings, piston rings still do not have enough resistance to wear, scuffing and corrosion resistance, particularly when one considers the future generations of engines with even higher operating loads. One reason, but not the only reason for this is the high porosity of the protective layers, about 10-15%, and a limitation of the proportion of wear-resistant components in the layer due to the spraying process used.

Another problem consists in that the piston rings of large-volume engines, requiring, for example, cylinder diameters of about 190 mm to about 1000 mm require layers that are sufficiently thick on the piston rings to ensure the desired service life of 30,000 hours. However, as the coatings become thicker, the problems associated with the differing coefficients of expansion of the materials used in the piston ring and the coating and the different thermal conductivity also become increasingly significant.

In order to reduce wear, and particularly piston ring freeplay in the piston groove, highly wear-resistant layer systems are needed that demonstrate good properties in balanced manner with regard to hardness, Young's modulus, shear strength, thermal stability, manufacturability and cost.

SUMMARY OF THE INVENTION

An object of the present invention is therefore to provide an improved wear protection layer and a coating method with which the/the wear properties of piston rings can be further improved.

This object is solved according to the invention with a wear-resistant layer that comprises the following elements in the proportions shown:

15-25% by weight Fe, 10-20% by weight W, 20-30% by weight Cr, 15-25% by weight Ni, 1-5% by weight Mo, 0.1 to 0.5% by weight P, 0.01-0.1% by weight B, 0.1-5% by weight C, 0.1-2% by weight Si.

The content of at least 30% iron and nickel in the composition and the layer results in a quasi-homogeneous system between the substrate and the coating, with the result that the thermal energy generated by mixed friction is dissipated more efficiently, particularly in the TDC or BDC area, and a uniform thermal relaxation process is assured by the temperature fluctuations present in the engine. Consequently, the wear protection layer has excellent thermal conductivity and only a minimal difference in the coefficient of thermal expansion compared with the piston ring itself. The use of Fe-based alloys as the piston ring base coating material together with molybdenum and Ni—Cr—P—Si—B compound and a carbide system, results in the production of a new type of piston ring.

THE DRAWINGS

FIG. 1 shows the microstructure of the TS-VI variant measured by SEM;

FIG. 2 shows the microstructure of the TS-V2 variant measured by SEM;

FIG. 4 shows the ring and cylinder liner wear after testing outside the engine, lubricated in the ring/cylinder system;

FIG. 5 shows the values determined for scuffing resistance of variants TS-V1 and TS-V2.

DETAILED DESCRIPTION

Figure 3:
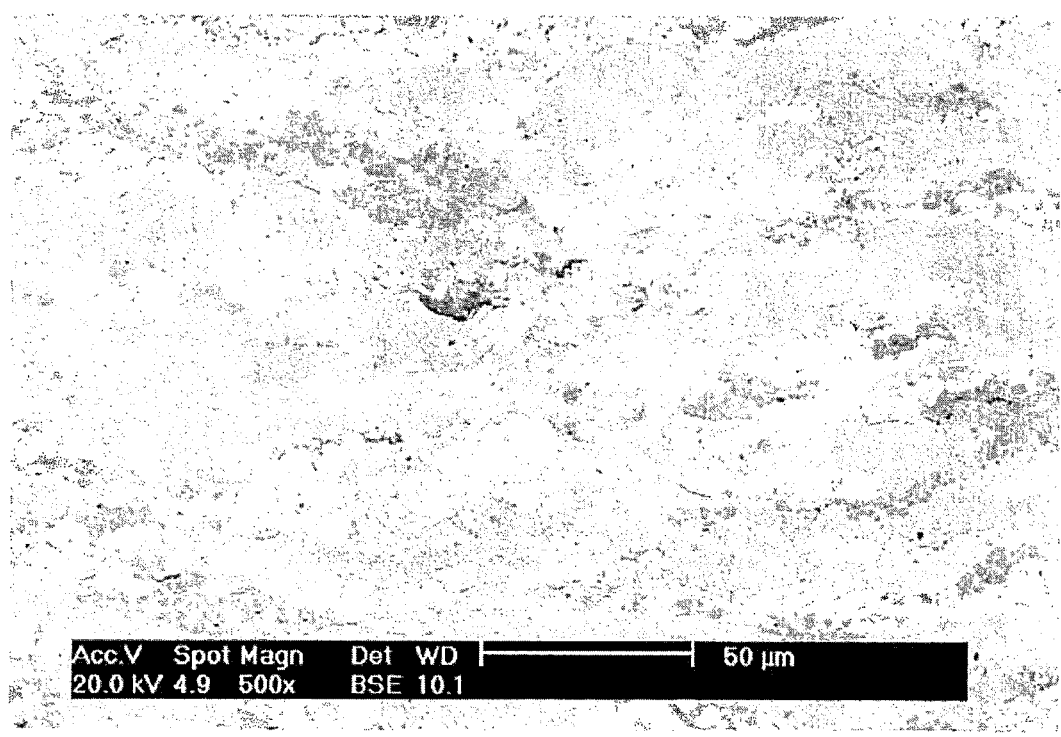
FIG. 3 shows that an increase in the phase 1 of TS-V2 causes an increase in carbide concentration.

The layer according to the invention generally comprises iron (Fe), tungsten (W in the form of WC), chromium (Cr in the form of Cr and $Cr_2C_3$), nickel (Ni), phosphorus, boron (B), molybdenum, silicon (Si), and carbon (C, partially bound to Fe, W and Cr as carbide).

Iron (Fe) is present in a quantity of 15-25% by weight, preferably in a quantity from 17 to 25% by weight, more preferably 18-25% by weight, still more preferably 20 to 25% by weight, and most preferably 22 to 25% by weight.

Tungsten (W) is present in a quantity of 10-20% by weight, preferably in a quantity of 12-20% by weight, more preferably 14 to 20% by weight, still more preferably to 20% by weight, and most preferably 18 to 20% by weight.

Chromium (Cr) is present in a quantity of 20 to 30% by weight, preferably in a quantity from 22 to 30% by weight, more preferably 24-30% by weight, still more preferably 26-30%, and most preferably 28-30% by weight.

Nickel (Ni) is present in a quantity of 15-25% by weight, preferably in a quantity from 17 to 25% by weight, more preferably 18-25% by weight, yet more preferably 20-25%, and most preferably 22-25% by weight.

Phosphorus (P) is present in a quantity of 0.1-0.5% by weight, preferably in a quantity of 0.2-0.5% by weight, more preferably 0.3-0.5% by weight, yet more preferably 0.4-0.5%.

Boron (B) is present in a quantity of 0.01-0.1% by weight, preferably in a quantity from 0.02 to 0.08% by weight, more preferably from 0.03 to 0.05% by weight, still more preferably 0.04 to 0.05%.

Carbon (C) is present in a quantity of 0.1 to 5 weight % by weight, preferably in a quantity of 0.5 to 5% by weight, more preferably 1-5% by weight, still more preferably 1-2% by weight.

Molybdenum is present in a quantity of 1-5% by weight, preferably in a quantity of 2-5% by weight, more preferably 2-4% by weight, yet more preferably 2-3% by weight.

Silicon (Si) is present in a quantity of 0.1-2% by weight, preferably in a quantity of 0.5 to 2% by weight, more preferably 1-2% by weight, still more preferably 1.5-2%.

Optionally, (Nb) and oxygen (O) may be present in the inventive wear-resistant layer.

Niobium (Nb) may be present in a quantity of 10-15% by weight, preferably in a quantity of 11-15% by weight, more preferably 12 to 15% by weight, still more preferably 13-15% by weight, and most preferably 14-15% by weight.

Oxygen may be present in a quantity of 0.1-2% by weight, preferably in a quantity of 0.1-0.8% by weight, more preferably from 0.2 to 0.5% by weight, still more preferably 0.3 to 0.5% by weight, and most preferably from 0.4 to 0.5% by weight.

It should be understood that the ranges set forth above may be permutated in any desired combination.

The elements listed above, Fe, W, Cr and Nb may be present in the native form thereof, or as carbides. The proportion of carbides may be from 20 to 50% by weight, preferably 25-50% by weight, more preferably 30-50% by weight, still more preferably from 35 to 45% by weight.

In this case, the content of WC is in the range from 10 to 20% by weight, the content of $Cr_2C_3$ is in the range from 10 to 25% by weight, and the content of NbC in the range from 5 to 15% by weight.

The preferred ranges for WC are 12-20% by weight, preferably 15 to 20% by weight, more preferably 15 to 18% by weight. The preferred ranges for $Cr_2C_3$ are 12-23% by weight, preferably 15 to 20% by weight, more preferably 18 to 20% by weight. The preferred ranges for NbC are 7-15% by weight, preferably 9-15% by weight, more preferably 10 to 12% by weight.

It should be understood that, as for the ranges listed above for the elements themselves, any permutation of the preferred ranges, also in combination with the preferred ranges of the elements themselves, is also disclosed herewith.

It has been found that the use of carbides further increases the scuff and wear resistance of the composition/coating of the invention. In addition, the use of nickel in the specified ranges and in combination with the other elements in the specified ranges results in an improvement of the shear strength and elastic behaviour, which lends the piston ring greater durability, particular in respect of its movement in the piston groove.

The wear protection layer may be applied to the substrate by any suitable method, a thermal spray process being preferred. Particularly preferred in this context is the HVOF process (High Velocity Oxygen-Fuel process), i.e., a high-velocity flame spraying process. The ingredients to be used for producing the wear-resistant layer are employed in the form of powders. The application of the HVOF process results in a particularly dense thermal coating on the substrate to be coated and a particularly low porosity The particle sizes of the powders used are generally in the range from 1-80 μm, preferably in the range 5-60 μm, more preferably in the range of 10-50 μm. The individual carbide particles preferably have a particle size from 0.1-5 μm, preferably a size in the range from 1-4 μm, and can be embedded in a NiCr matrix. The carbides may be present either through agglomerated and sintered particles or as primarily precipitated carbides.

The use of the iron-based alloy according to the invention as a piston base coating material together with molybdenum and tungsten carbide as a wear protection layer thus results in a new piston ring type having improved properties in terms of wear, scuffing and corrosion resistance.

The present invention further provides a piston ring coated with the wear protection layer. The piston ring to be coated can be any piston ring type, a compression ring, a scraper ring or the middle ring, made of either cast iron or steel. The piston ring is preferably coated with the wear protection layer in a thermal spraying process, preferably the HVOF process.

The thickness of the coating can be in the range from 20-1500 μm, preferably in the range from 20 μm to 1000 μm, more preferably 20-800 μm.

The hardness of the coating of a piston ring coated with the wear-resistant coating according to the invention may be from 550-950 HV 1 (Vickers hardness test).

Such coated piston rings are used mainly in internal combustion engines. However, the sulphur-containing oils that are generated during such use cause a reaction between the molybdenum in the wear protection layer of the piston ring and the sulphur to yield $MoS_2$, which in turn is an excellent solid lubricant due to its crystalline structure. Through this reaction, the susceptibility to scuffing or seizing of the tribological system is improved. $MoS_2$ has a typical layer lattice consisting of an array of sulphur-metal-sulphur planes parallel to the hexagonal base plane (001). Within these planes there are strong covalent bonds. However, the planes are connected to each other only by weak van der Waals interactions. This graphite-like anisotropic layer structure determines the low material hardness and excellent cleavability along the (001) planes, with the result that excellent emergency running properties are achieved.

The following examples illustrate the invention and are not intended to be limiting thereof.

EXAMPLES

I. Wear Protection Layers

The following wear protection layer variants were prepared and compared with each other:

TS-VI: A composite of Mo and $Cr_2C_3$—NiCr (MKP200, commercially available industrial scale product manufactured by Federal-Mogul) as a reference, produced by plasma spraying TS-V2: A 4-phase mixture
Phase 1: FeCr base+WC/Cr2C3-NiCr;
Phase 2: Ni—Cr—P—Si—B compound;
Phase 3: Molybdenum;
Phase 4: NbC
with a mixing ratio of 70/10/10/10 produced by HVOF II. Test Conducted The TS V2 layer was analysed with regard to chemical composition (Table 1), porosity and hardness (Table 2), microstructure (FIGS. 1-3), and examined for wear and scuffing behaviour (FIGS. 4 and 5).

Table 1 shows the chemical composition of the coating system used in the test (3 measurements V2a to V2c).

TABLE 1

Chemical composition of wear protection layers used in the test.
CHEMICAL COMPOSITION

| Fe | W | Cr | Ni | Nb | Mo | C | Si | P | O | B |
|----|----|----|----|----|----|----|----|----|----|----|
| | | | | (% by weight) | | | | | | |
| 22.9 | 13.8 | 25.5 | 21.6 | 12.7 | 2.7 | 1 | 0 | 0.5 | 0.3 | 1.0 | 0.05 |
| 22.0 | 12.0 | 25.7 | 22.5 | 12.8 | 3.7 | 1.2 | 0.8 | 0.3 | 1.0 | 0.07 |
| 23.6 | 13.2 | 25.1 | 22.1 | 11.8 | 3.0 | 1.4 | 0.6 | 0.3 | 1.1 | 0.06 |

The microstructure, porosity and hardness, as well as the wear and scuffing behaviour were also tested for the variants according to conventional methods. The values obtained are shown in Table 2.

TABLE 2

Values found for porosity and mechanical properties

| Test # | Target carbide content (% by weight) | Hardness HV1 | Porosity % |
|--------|--------------------------------------|--------------|------------|
| TS-V1  | 20 | 390-660 | 9 |
| TS-V2  | 30 | 764-888 | 1 |

This shows that the porosity of the layers according to the invention is greatly reduced compared with the comparison layer, and that an increase in the carbide concentration leads to an increase in the hardness of the wear-resistant layer.

The microstructure and phase distribution were also examined with scanning electron microscopy (FIG. 1). This shows that variant I contains no molten particles, homogeneously distributed $Cr_2C_3$ areas together with molybdenum in a nickel-chrome matrix. Examinations showed that porosity did not exceed 10%.

From FIG. 2 it may be seen that in the variant according to the invention, TS-V2, the carbides are distributed homogeneously, only a few partially molten particles are present, molybdenum and WC and $Cr_2C_3$ areas in a NiCr matrix and NbC, and Ni are homogeneously distributed. Porosity is approximately 1%. The coarser, light areas corresponding to tungsten carbide, the very flat, also bright areas correspond to molybdenum, the medium grey areas are nickel, and the dark grey areas are $Cr_2C_3$ or the FeCr-containing phases.

The larger coarse and light areas in FIG. 3 (corresponding to tungsten carbide) show that an increase in the content of FeCr base+WC/$Cr_2C_3$—NiCr leads to an increase in the carbide concentration in the wear protection layer.

Wear and scuffing tests were also conducted outside the engine. For this, a segment of a coated sliding member is fixed in a holder and oscillated with a constant force and speed over a counter-body in an oil bath. The results are shown in FIGS. 4 and 5.

From FIG. 4 it may be seen that a significant improvement in wear resistance may be achieved compared to a protective layer known from the prior art by using the wear-resistant layer according to the invention, resulting in a reduction of the ring and cylinder liner wear by more than 90%.

Scuffing behaviour was also investigated. For this, basically the same experimental setup is used as for the wear test, with the difference that a low lubrication state is created and the load is increased at constant time intervals. The measurement was terminated as soon as the friction coefficient was reached >0.3. As may be seen in FIG. 5, the inventive variant TS-V2 shows improved scuffing behaviour compared to the variant TS-VI. Without being bound by theory it is presently believed that this is due to the dense layer, caused by the HVOF technology in combination with the low melting point of the Ni—Cr—B—Si-component, the increased carbide content and the still present molybdenum in the HVOF layers.

In the non-motor tests, it was thus found that the inventive coatings for piston rings are better in terms of wear and scuffing behaviour than the current PVD-CrN-based coatings (F-M material specification GOE242), which are used in automotive and heavy duty engines.

From the experimental results it is clear that with this coating system a new type of piston ring has been created.

The invention claimed is:
1. A wear-resistant coating for piston rings, comprising:
15-25% by weight Fe,
10-20% by weight W,
20-30% by weight Cr,
15-25% by weight Ni,
1-5% by weight Mo,
0.1-0.5% by weight P,
0.01-0.1% by weight B,
0.1-5% by weight C,
0.1-2% by weight Si, and
10-15% by weight Nb.
2. The wear-resistant layer according to claim 1, wherein 15 to 50% by weight of carbides are present.
3. The wear-resistant layer according to claim 2, wherein the following carbides are present in the following quantities
WC from 10-20% by weight, and/or
$Cr_2C_3$ from 10-25% by weight, and/or
NbC from 5-15% by weight.

4. A method for applying a wear-resistant layer to a substrate, comprising the steps of:
   (i) Providing the following ingredients in powder form;
      15-25% by weight Fe,
      10-20% by weight W,
      20-30% by weight Cr,
      15-25% by weight Ni,
      1-5% by weight Mo,
      0.1-0.5% by weight P,
      0.01-0.1% by weight B,
      0.1-5% by weight C,
      0.1-2% by weight Si, and
      10-15% by weight Nb,
   (ii) high-speed flame spraying of ingredients onto the substrate.

5. The method according to claim 4, wherein the particle sizes of the elemental powders are in a range from 1 to 80 μm.

6. The method according to claim 5, wherein the carbides are present as agglomerated and sintered particles or as primary precipitated carbides.

7. The method according to claim 4, wherein the substrate is a piston ring.

8. A piston ring, comprising a piston ring substrate coated with a wear-resistant layer comprising:
   15-25% by weight Fe,
   10-20% by weight W,
   20-30% by weight Cr,
   15-25% by weight Ni,
   1-5% by weight Mo,
   0.1-0.5% by weight P,
   0.01-0.1% by weight B,
   0.1-5% by weight C,
   0.1-2% by weight Si, and
   10-15% by weight Nb.

9. The piston ring according to claim 8, wherein the layer thickness of the coating is in the range from 20-1000 μm.

10. The piston ring according to claim 8, wherein the hardness of the coating is in the range from 550 to 950 HV1.

11. The method according to claim 4, wherein 15 to 50% by weigh of carbides are present and have a particle size in the range of 0.1-5 μm.

* * * * *